(12) United States Patent
Brandt-Sanz et al.

(10) Patent No.: US 9,725,685 B2
(45) Date of Patent: Aug. 8, 2017

(54) UNIT DOSE ARTICLE

(71) Applicant: The Procter & Gamble Company, Cincinnati, OH (US)

(72) Inventors: Miguel Brandt-Sanz, Wachtberg (DE); Yann Healy, Strombeek-Bever (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 14/191,561

(22) Filed: Apr. 3, 2014

(65) Prior Publication Data

US 2015/0210969 A1 Jul. 30, 2015

(30) Foreign Application Priority Data

Jan. 30, 2014 (CA) .................................... 2841024

(51) Int. Cl.

| | |
|---|---|
| *C11D 17/00* | (2006.01) |
| *C11D 17/04* | (2006.01) |
| *C11D 11/00* | (2006.01) |
| *B08B 9/20* | (2006.01) |
| *B65D 75/32* | (2006.01) |
| *B65B 9/04* | (2006.01) |
| *B29C 51/10* | (2006.01) |
| *B65B 3/02* | (2006.01) |
| *B65B 7/00* | (2006.01) |
| *B65D 65/46* | (2006.01) |
| *B29L 31/00* | (2006.01) |

(52) U.S. Cl.
CPC ............ *C11D 17/042* (2013.01); *B29C 51/10* (2013.01); *B65B 3/02* (2013.01); *B65B 7/00* (2013.01); *B65B 9/04* (2013.01); *B65D 75/322* (2013.01); *B65D 75/323* (2013.01); *C11D 17/043* (2013.01); *C11D 17/044* (2013.01); *C11D 17/045* (2013.01); *B29L 2031/7174* (2013.01); *B65D 65/46* (2013.01)

(58) Field of Classification Search
None
See application file for complete search history.

(56) References Cited

U.S. PATENT DOCUMENTS

| | | |
|---|---|---|
| 3,057,127 A | 10/1962 | Gex et al. |
| 3,218,776 A | 11/1965 | Cloud |
| 3,929,678 A | 12/1975 | Laughlin et al. |

(Continued)

FOREIGN PATENT DOCUMENTS

| | | |
|---|---|---|
| EC | D000078506-0001 | 9/2003 |
| EC | D001659053-0001 | 1/2010 |

(Continued)

OTHER PUBLICATIONS

PCT Search Report; Dated Sep. 28, 2014; PCT/US2014/018822; 13 Pages.

(Continued)

*Primary Examiner* — Lorna Douyon
(74) *Attorney, Agent, or Firm* — Gregory S. Darley-Emerson; Leonard W. Lewis; Steven W. Miller

(57) ABSTRACT

A water soluble unit dose article comprising at least one compartment, wherein the compartment comprises a composition, and wherein the compartment has a substantially super-elliptical shape. A method of making the unit dose article. An apparatus used in the process.

16 Claims, 6 Drawing Sheets

(56) References Cited

U.S. PATENT DOCUMENTS

| | | | |
|---|---|---|---|
| 4,259,217 A | 3/1981 | Murphy | |
| 4,765,916 A | 8/1988 | Ogar et al. | |
| 4,810,410 A | 3/1989 | Diakun et al. | |
| 4,972,017 A | 11/1990 | Smith et al. | |
| 5,114,611 A | 5/1992 | Van Kralingen et al. | |
| 5,227,084 A | 7/1993 | Martens et al. | |
| RE34,606 E | 5/1994 | Estell et al. | |
| 5,679,630 A | 10/1997 | Baeck et al. | |
| 5,977,053 A | 11/1999 | Groth et al. | |
| 6,312,936 B1 | 11/2001 | Poulose et al. | |
| 7,407,923 B2 | 8/2008 | Wiedemann et al. | |
| 7,527,880 B2 | 5/2009 | Catalfamo | |
| 8,551,929 B2 | 10/2013 | Graham et al. | |
| 8,754,025 B2 | 6/2014 | Wiedemann et al. | |
| 2002/0033004 A1 | 3/2002 | Edwards et al. | |
| 2002/0169092 A1 | 11/2002 | Alexandre Catlin et al. | |
| 2004/0011693 A1 | 1/2004 | Prenger et al. | |
| 2007/0241022 A1 | 10/2007 | Denome et al. | |
| 2008/0081774 A1* | 4/2008 | Koch | 510/101 |
| 2009/0196891 A1 | 8/2009 | Ayats et al. | |
| 2009/0199877 A1 | 8/2009 | Koch et al. | |
| 2009/0312220 A1* | 12/2009 | Boutoille et al. | 510/277 |
| 2012/0235329 A1* | 9/2012 | Fowler et al. | 264/571 |

FOREIGN PATENT DOCUMENTS

| | | |
|---|---|---|
| EP | 0414549 A2 | 2/1991 |
| EP | 1375637 A1 | 1/2004 |
| EP | 1394065 A1 | 3/2004 |
| EP | 1504994 A2 | 2/2005 |
| EP | 2617659 | 7/2013 |
| GB | 2 405 828 A | 3/2005 |
| JP | 2012025400 A | 2/2012 |
| WO | WO 89/06270 A1 | 7/1989 |
| WO | WO 94/02597 A1 | 2/1994 |
| WO | WO 94/18314 A1 | 8/1994 |
| WO | WO 94/22800 A1 | 10/1994 |
| WO | WO 95/01416 A1 | 1/1995 |
| WO | WO 96/23873 A1 | 8/1996 |
| WO | WO 96/23874 A1 | 8/1996 |
| WO | WO 97/43424 A1 | 11/1997 |
| WO | WO 99/23211 A1 | 5/1999 |
| WO | WO 00/55045 A1 | 9/2000 |
| WO | WO 00/60060 A2 | 10/2000 |
| WO | WO 02/42408 | 5/2002 |
| WO | WO 02/085736 A1 | 10/2002 |
| WO | WO 02/092456 A1 | 11/2002 |
| WO | WO 02/102955 A1 | 12/2002 |
| WO | WO 2004/111178 A1 | 12/2004 |
| WO | WO 2005/052146 A2 | 6/2005 |
| WO | WO 2005/052161 A2 | 6/2005 |
| WO | WO 2006/002643 A2 | 1/2006 |
| WO | WO 2007/044993 A2 | 4/2007 |
| WO | WO 2007/116357 | 10/2007 |
| WO | WO 2007/145964 A2 | 12/2007 |
| WO | WO 2012/100834 A1 | 8/2012 |
| WO | WO 2013/190517 A2 | 12/2013 |

OTHER PUBLICATIONS

Search Report for Application No. GB1403442.5, dated Nov. 22, 2014, 10 pages.

* cited by examiner

UNIT DOSE ARTICLE

FIELD OF THE INVENTION

The present invention relates to unit dose articles, methods of their use, methods of their production and equipment used to manufacture them.

BACKGROUND OF THE INVENTION

Water-soluble unit dose articles are known. Such articles often comprise compositions intended to be released into an aqueous liquid upon addition of the article to the aqueous liquid. Normally the article is manufactured such that the composition is contained within a compartment formed from a water-soluble film. Upon addition to water, the film dissolves and releases the composition. Consumers find such articles both convenient and efficient for a range of applications.

The articles are manufactured by forming a water-soluble film in a mould to the desired shape. Rectangular or square shapes are often used as these maximize the volume available for the composition. However, when the film is formed into square or rectangular shaped moulds, areas of weakness, or increased stress, are formed into the corners due to over-stretching of the film. These areas of weakness are prone to forming pinholes, ripping or splitting during manufacture, packing, shipping, or other general handling, causing failure of the article. These areas of weakness form regardless of whether the corners are rounded or are formed from sharp angles.

Articles manufactured to have a circular shape overcome the article structural integrity issue, however have the downside of reduced internal volume available for the composition for a given amount of film material used during manufacture of the product using conventional methods. The internal volume can be smaller than wanted for a particular application. Altering the footprint of the pouch results in increased film material usage which results in higher costs. When the diameter of the mold is increased to compensate for volume lost for the circle-shaped mould, fewer mold cavities will fit across the width of a manufacturing line and consequently fewer articles will be produced.

Furthermore, circular shaped pouches result in complexity during manufacture. During manufacture, film is formed into the relevant 3D shape in order to make the pouch. Often a first film and a second film are used to make the pouch, said films being sealed together at a seal area. Conventional unit dose article making methods involve the use of moulds which comprise a matrix of multiple rows and columns of mould cavities. Each cavity is used to form a separate article once cut and separated from a web of unit dose articles made. Once sealed and cut from the web of unit dose articles produced, excess film material can then be cut away from the edges of the article. If the seal area is circular, this adds complexity to the cutting operation. Alternatively, the seal area may be cut into a square or rectangular shape, which removes a degree of manufacturing complexity, however, this results in wasted film material in the case where the seal area itself is circular in shape. This wasted film material negatively increases the overall dissolution time of the pouch (especially when it is considered that the wasted material consists of two films sealed together so also represents the 'thickest' part of the film material) and also has a negative impact on the aesthetic qualities of the pouch.

Therefore, there is a need in the art for a water-soluble unit dose article that maximizes internal volume whilst still maintaining excellent structural stability (especially avoiding corners) and dissolution speed.

The Inventors surprisingly found that a water-soluble unit dose article having a substantially super-elliptical shape met this need.

SUMMARY OF THE INVENTION

A first aspect of the present invention is a water soluble unit dose article comprising at least one compartment, wherein the compartment comprises a composition, and wherein the compartment has a substantially super-elliptical shape.

A second aspect of the present invention is a method of making a water soluble unit dose article according to the first aspect.

A third aspect of the present invention is a mould for making a water-soluble unit dose article of the first aspect using a process according to the second aspect.

DETAILED DESCRIPTION OF THE INVENTION

Water Soluble Unit Dose Article

Figure 1:
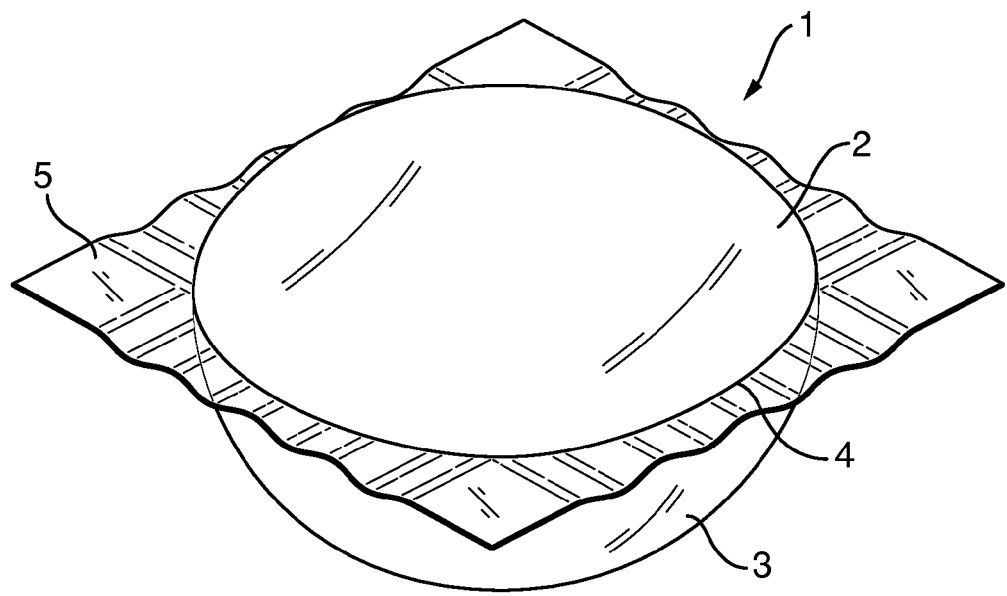
FIG. 1. A three dimensional representation of a unit dose article according to the present invention.

The present invention is to a water soluble unit dose article (1) (FIG. 1). The unit dose article (1) of the present invention comprises at least one compartment (2), wherein the compartment (2) comprises a composition. According to the present invention the compartment (2) has a substantially super-elliptical shape. A unit dose article (1) is intended to provide a single, easy to use, dose of the composition contained within the article, for a particular application.

The compartment (2) should be understood as meaning a closed internal space within the unit dose article, which holds the composition. Preferably, the unit dose article comprises a water-soluble film (3). The unit dose article is manufactured such that the water-soluble film (3) completely surrounds the composition and in doing so defines the compartment (2) in which the composition resides. The unit dose article may comprise two films. A first film may be shaped to comprise an open compartment into which the composition is added. A second film is then laid over the first film in such an orientation as to close the opening of the compartment. The first and second films are then sealed together along a seal region (4). The seal region (4) may comprise a flange (5). Said flange (5) is comprised of excess sealed film material that protrudes beyond the edge of the unit dose article and provides increased surface area for seal of the first and second films. The film is described in more detail below.

Figure 2:
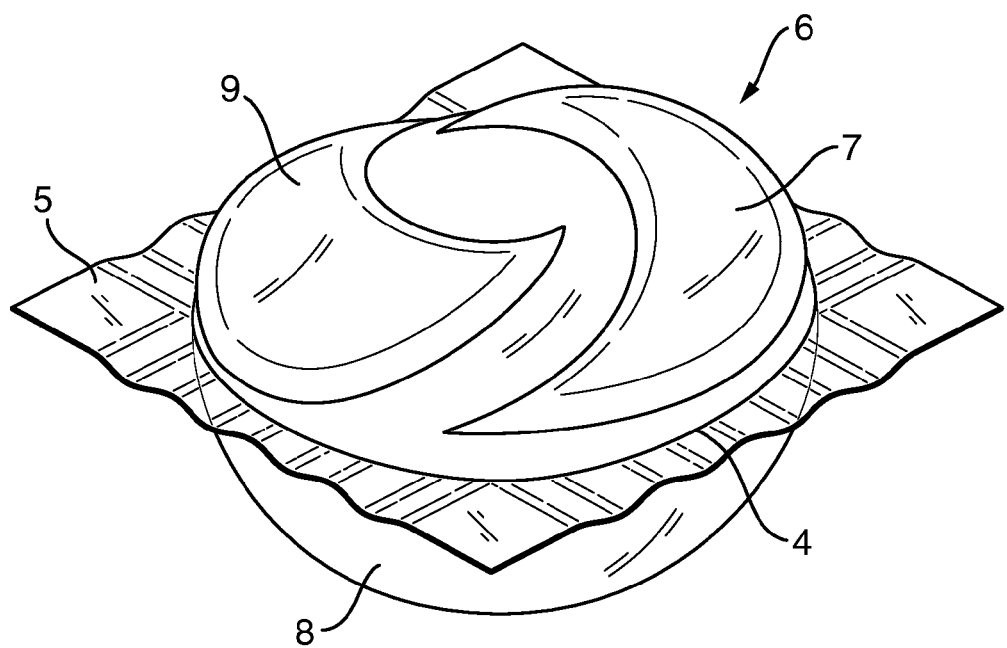
FIG. 2. A three dimensional representation of a multi-compartment unit dose article according to the present invention.

The unit dose article (1) may comprise more than one compartment (6) (FIG. 2), even at least two compartments, or even at least three compartments. The compartments may be arranged in superposed orientation (6), i.e. one positioned on top of the other. Alternatively, the compartments may be positioned in a side-by-side orientation, i.e. one orientated next to the other. The compartments may even be orientated in a 'tyre and rim' arrangement, i.e. a first compartment is positioned next to a second compartment, but the first compartment at least partially surrounds the second compartment, but does not completely enclose the second compartment. Alternatively one compartment may be completely enclosed within another compartment.

Wherein the unit dose article comprises at least two compartments (6), one of the compartments (7) may be smaller than the other compartment (8). Wherein the unit dose article comprises at least three compartments, two of the compartments (7, 9) may be smaller than the third compartment (8), and preferably the smaller compartments are superposed on the larger compartment (6). The superposed compartments preferably are orientated side-by-side (7,9).

The composition may be any suitable composition. The composition may be in the form of a solid, a liquid, a dispersion, a gel, a paste or a mixture thereof. Non-limiting examples of compositions include cleaning compositions, fabric care compositions and hard surface cleaners. More particularly, the compositions may be a laundry, fabric care or dish washing composition including, pre-treatment or soaking compositions and other rinse additive compositions. The composition may be a fabric detergent composition or an automatic dish washing composition. The fabric detergent composition may be used during the main wash process or could be used as pre-treatment or soaking compositions. The composition is described in more detail below.

At least one compartment has a substantially superelliptical shape. The overall shape of the unit dose article may also be substantially superelliptical. It should be understood, as is described in more detail below, that the article may or may not include any excess sealed film material present as a flange in the seal region. The outer perimeter of the flange may or may not also have a super elliptical shape.

A super-ellipse is a closed curved shape that has a continuous curve but in which the radius of curvature can change along its perimeter. However, a super-ellipse shape has no straight lines or angled corners.

By substantially superelliptical we herein mean a shape that has an outline which is mainly superelliptical, but the outline may comprise imperfections, such as indents or protrusions. However, the overall shape is one which is superelliptical.

Figure 3:
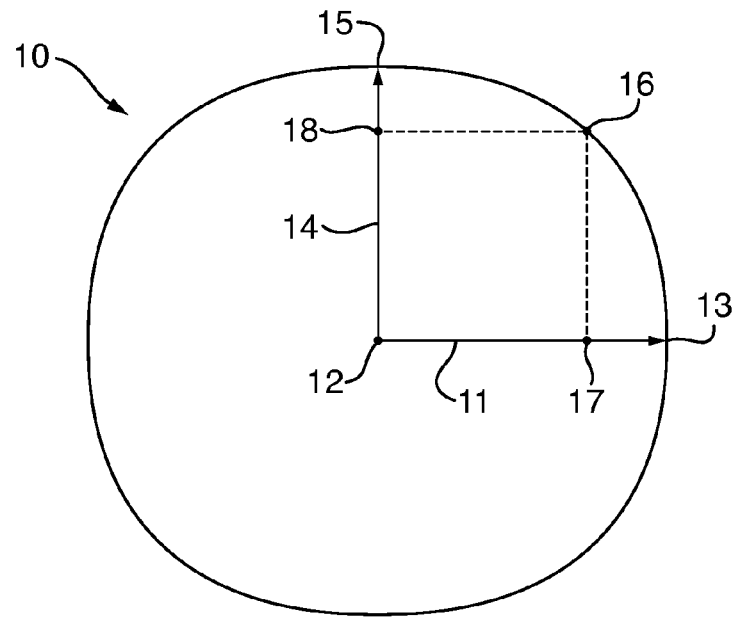
FIG. 3. Representation of a superelliptical shape.

A superellipse shape (10) can be defined mathematically using the following Equation 1, and as illustrated in FIG. 3;

$$\left|\frac{x}{a}\right|^n + \left|\frac{y}{b}\right|^n = 1 \qquad \text{Equation 1}$$

wherein n is 2.0 or greater, or even where n is greater than 2.0, and wherein a is the total length of a first axis (11) that runs from the geometric centre of the superellipse shape (12) to a point on the edge of the superellipse (13), and b is the total length of a second axis (14) that runs from the geometric centre of the superellipse shape (12) to a point on the edge of the superellipse (15), and wherein a and b are at an angle of 90° from one another and around which the shape of the superellipse is symmetrical, and wherein x and y define a point on the superellipse (16), where x is the distance from the geometric centre along a (17) and y is the distance from the geometric centre along b (18).

It should be noted that Equation 1 theoretically equals 1. However, there may be a slight tolerance/error in the manufacture of the equipment and apparatus to make the unit dose articles. Therefore, for any x, b, a, b value or combinations, 1 the equation may not equal exactly 1. The skilled person would under slight error is to be expected due to this and also due to calculation/human error. Error may be up to 1%.

It should be noted that in accordance with the present invention, it is not intended that the term 'superellipse' includes a circle. It should be noted that an ellipse is a unique form of a superellipse, and so the term 'superellipse' also includes an elliptical shape. An ellipse is a superellipse where n is equal to 2.0.

Figure 4:
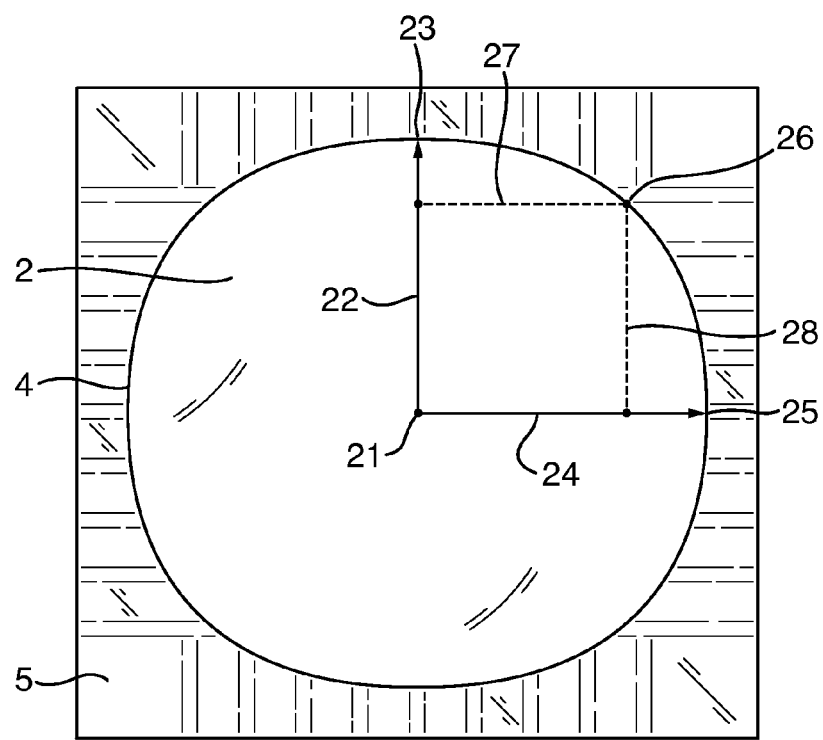
FIG. 4. A two-dimensional cross section of a unit dose article according to the present invention, viewed from above.

At least one compartment of said unit does article has a substantially superelliptical shape (FIG. 1). Wherein the compartment has a substantially superelliptical shape, we herein mean at least one cross-section of the compartment has a substantially superelliptical shape (FIG. 4). Preferably, the unit dose article comprises a seal region (4), and said seal region has a substantially superelliptical shape (FIG. 4). In this case, the seal region represents the at least one cross-section of the unit dose article that has a superelliptical shape (FIG. 4). The unit dose article may comprise one compartment and said compartment defines the shape of the unit dose article (FIGS. 1 and 4.). By substantially superelliptical we herein mean the compartment has a general shape which is mainly superelliptical, but the shape may comprise imperfections, such as indents or protrusions.

As described above, the compartment comprises a seal region (4). This is the area at which the opening of the compartment (2) is sealed in order to form a closed unit dose article. Preferably, the unit dose article comprises two films (FIG. 5), wherein a first (19) and a second film (20) are sealed together at the seal region (4) to form the compartment (2), and wherein the seal region (4) has a substantially superelliptical shape. The shape of the compartment may be defined mathematically as follows, together with FIG. 4. The compartment (2) has a geometric centre point (21) and a first axis (22) that runs from the geometric centre point (21) to a point on the seal region (23) and a second axis (24) that runs from the geometric centre point (21) to a point on the seal region (25) and wherein the first and second axis are at an angle of 90° to one another and around which the shape of the seal region (4) is symmetrical, and wherein the shape of the seal region is defined by Equation1;

wherein n is 2.0 or greater, and wherein a is the total length of the first axis (22) and b is the total length of the second axis (24), and wherein x and y define a point on the seal region (26), where x is the distance from the geometric centre along a (27) and y is the distance from the geometric centre along b (28).

The compartment may have a shape as defined above. If n is equal to 2.0, then a is different to b. The compartment may have a superelliptical shape where n is greater than 2.0. The compartment may have a shape as defined above, wherein the ratio of a to b is from 1:10 to 10:1, or even from 1:5 to 5:1, or even from 1:2 to 2:1, or even from 1:1.2 to 1.2:1, or even 1:1.1 to 1.1:1, or even 1:1. The compartment may have a shape as defined above, wherein n is greater than 2.0, but no greater than 5.5, or wherein n is between 2.1 and 5.5, or even between 2.2 and 3.5, or even between 2.2 and 3.0, or even 2.37.

The compartment may have a superelliptical shape where n is greater than 2.0, preferably, between 2.2 and 3.0, or even 2.37, and the ratio of a to be is from 1:2 to 2:1 or even from 1:1.2. to 1.2:1, or even 1.1:1 to 1:1.1.

In one embodiment, the unit dose article (1) comprises just one compartment. Alternatively, the unit dose article may comprise more than one compartment, in which case at least one compartment of the unit dose article may have a substantially superelliptical shape (FIG. 6).

Figure 5:
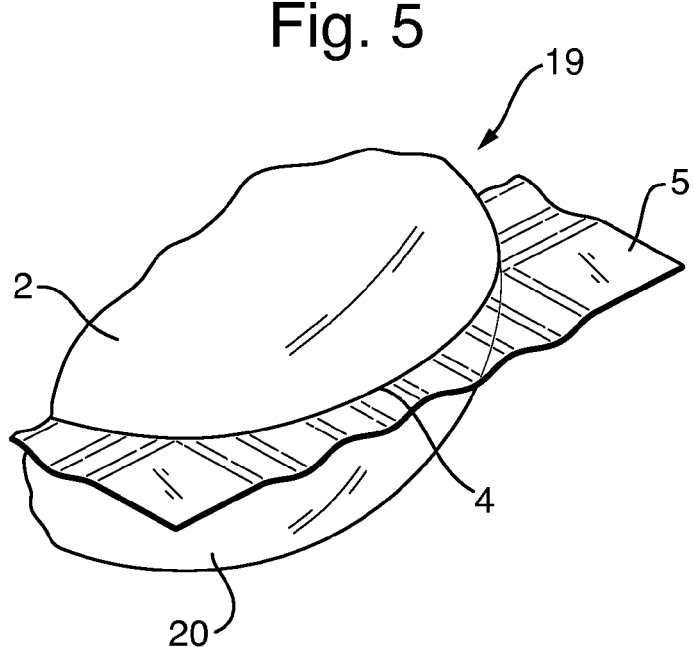
FIG. 5. A close-up view of a seal region and flange of a unit dose article according to the present invention.
Figure 6:
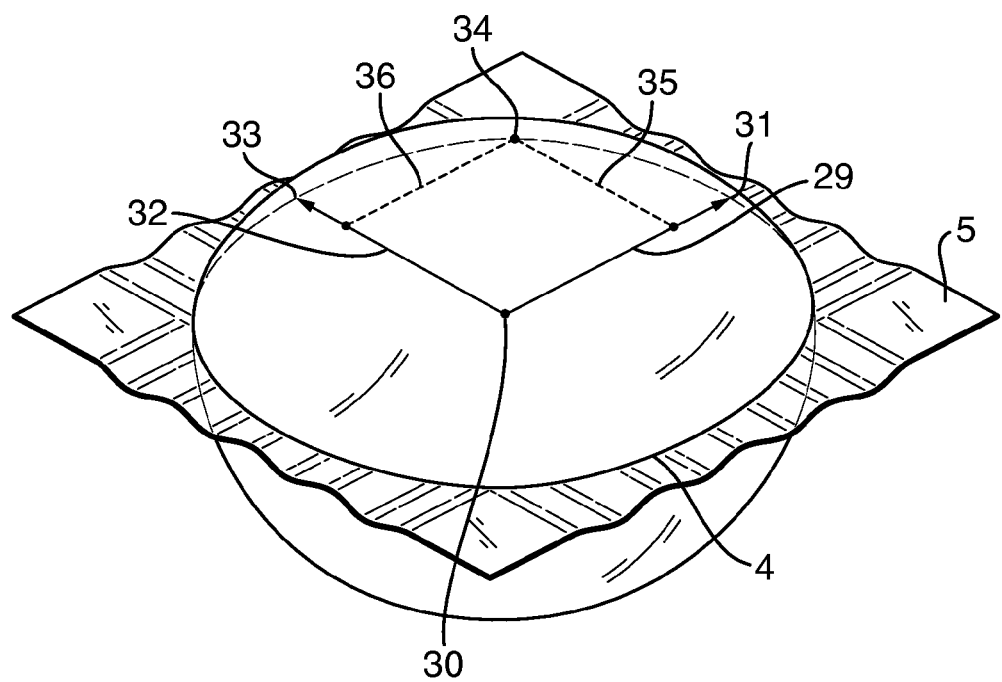
FIG. 6. A three dimensional representation of a unit dose article according to the present invention.
Figure 7:
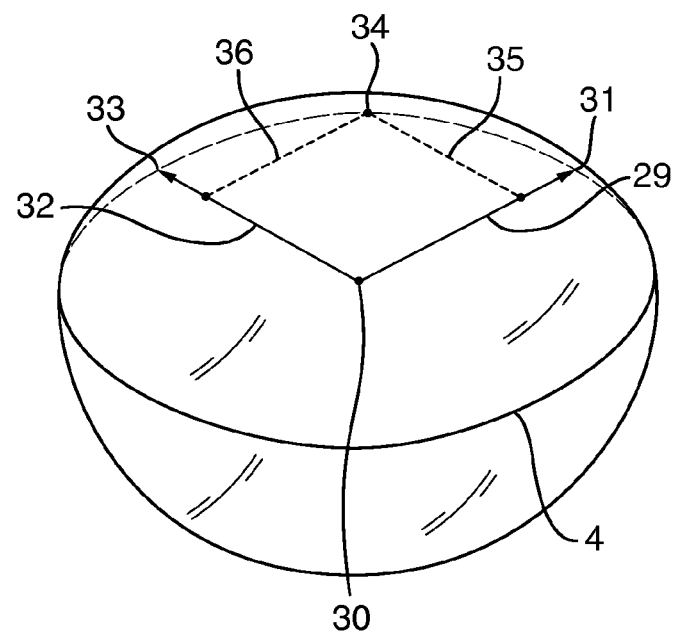
FIG. 7. A three dimensional representation of a unit dose article according to the present invention.

The unit dose article may have a superelliptical shape as defined by Equation 1 (FIG. 6). As detailed above, the point at which the film or films are sealed together is defined as the seal region (4). The unit dose article may comprise a flange (5) composed of excess sealed film material (FIG. 6). The flange (5) is present on the outside of the unit dose article. As can be seen in FIG. 5, in the context of the present invention, the seal region (4) is the point at which a first film (19) and a second film (20) join, and does not include the flange (5) which is composed of excess sealed film material. In one embodiment, the unit dose article does not comprise a flange (FIG. 7). In the embodiment where a flange (5) is present (FIG. 6), the outer shape of the unit dose article may not be construed to include the flange (5). In which case, the outer shape is defined by the seal region (4) (FIGS. 4 and 6).

Therefore, with regard to the above formula, the seal region (4) defines the outer edge of the unit dose article (FIG. 6). The first axis (29) runs from the geometric centre (30) of the unit dose article to a point on the outer edge of the unit dose article (31), and b is the total length of a second axis (32) that runs from the geometric centre (30) of the unit dose article to a point on the edge of the unit dose article (33), and wherein a and b are at an angle of 90° from one another around which the superelliptical shape is symmetrical, and wherein x and y define a point on the edge of the unit dose article (34), the edge being on the seal region (4), where x is the distance from the geometric centre of the unit dose article (35) and y is the distance from the geometric centre of the unit dose article along b (36).

Figure 8:
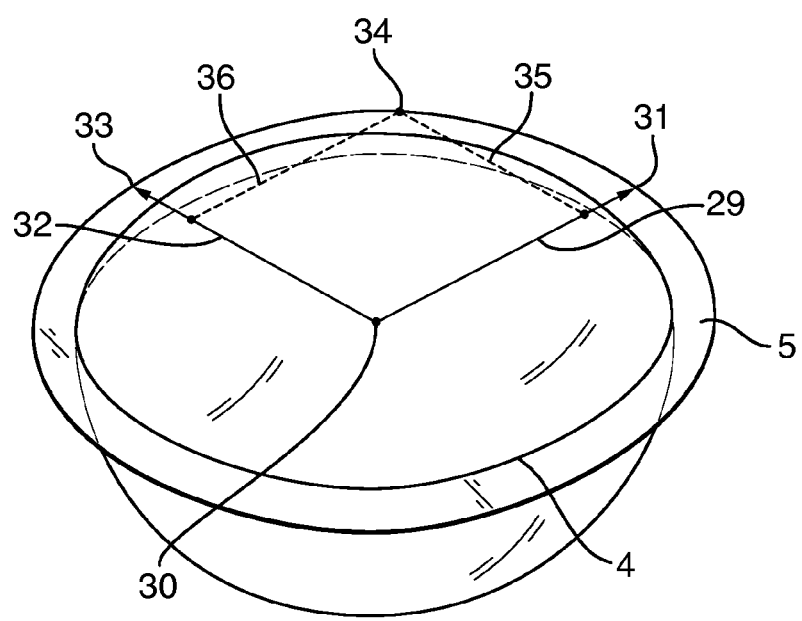
FIG. 8. A three dimensional representation of a unit dose article according to the present invention.

Alternatively, the outer shape of the unit dose article may be defined by the shape of the flange (5) (FIG. 8), in which case the shape of the flange represents the outer shape of the unit dose article.

The flange may have any shape, but will often be square or rectangular shape as result of cutting operations of conventional manufacturing methods. However the flange may be trimmed or cut to other shapes.

Preferably, the unit dose article has a superelliptical shape as defined by the above formula. When n is exactly 2.0, then a is different to b. The unit dose article may have a shape where n is greater than 2.0. The ratio of a to b may be from 1:10 to 10:1, or even from 1:5 to 5:1, or even from 1:2 to 2:1, or even from 1:1.2 to 1.2:1, or even 1:1.1 to 1.1:1, or even 1:1. The unit dose article may have a superelliptical shape as defined above and n is greater than 2.0, but no greater than 5.5, or wherein n is between 2.1 and 5.5, or even between 2.2 and 3.5, or even between 2.2 and 3.0, or even 2.37.

Figure 9:
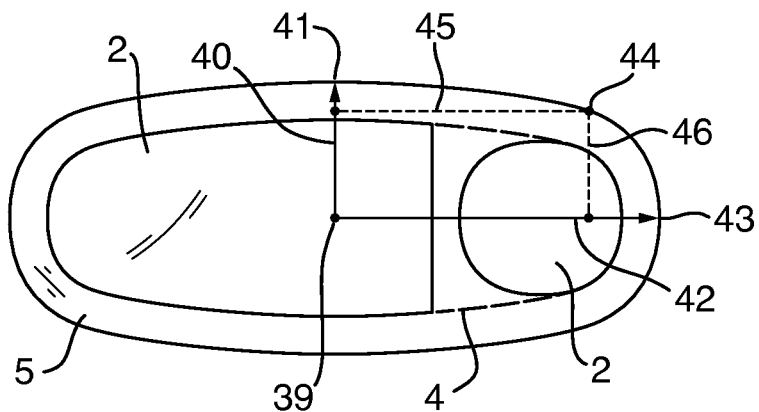
FIG. 9. A two-dimensional representation of a multi-compartment unit dose article according to the present invention, viewed from above.
Figure 10:
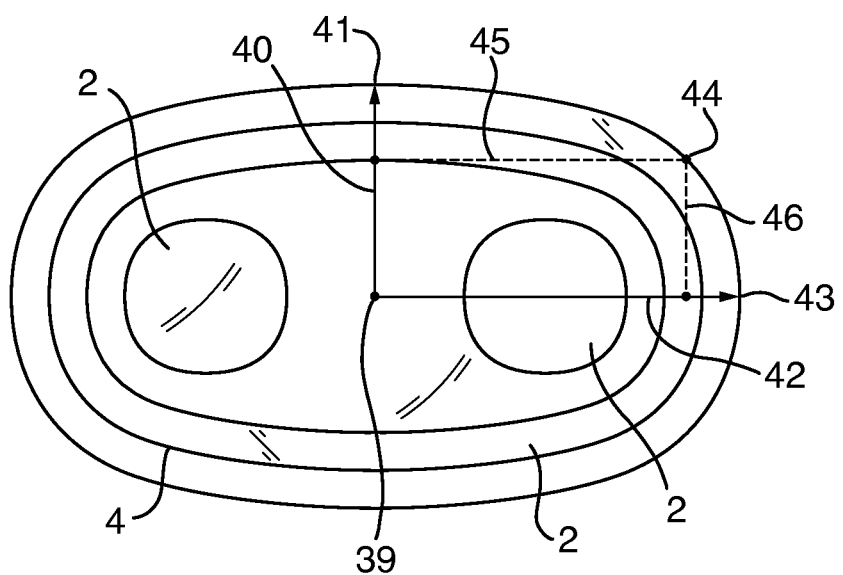
FIG. 10. A two-dimensional representation of a multi-compartment unit dose article according to the present invention, viewed from above.

The unit dose article may have a superelliptical shape where n is greater than 2, preferably, between 2.2 and 3.0, or even 2.37, and the ratio of a to be is from 1:2 to 2:1 or even from 1:1.2. to 1.2:1.

Where there is more than one compartment, each individual compartment may not necessarily have a superelliptical shape, however, the orientation of the compartments together form a substantially superelliptical shape. Such orientation may include the scenario wherein the compartments are arranged side-by-side to one another (FIG. 9) or in a 'tyre and rim' orientation (FIG. 10). In such orientations the seal region runs between the compartments. Preferably, said seal region has an overall substantially superelliptical shape. The combination of the compartments together may for a superelliptical shape, such that each compartment may not be superelliptical but when all compartments are looked at collectively, the overall shape is superelliptical. The unit dose article may also comprise a seal region which may or may not have a substantially superelliptical shape.

More preferably, the multi-compartment unit dose article has a geometric centre point (39) and a first axis (40) that runs from the geometric centre point (39) to a point on the edge of the seal region (41) and a second axis (42) that runs from the geometric centre point to a point on the edge of seal region (43) and wherein the first and second axis are at an angle of 90° to one another and around which the shape of the seal region (4) is symmetrical, and wherein the shape of the seal region is defined by Equation 1;

wherein n is 2 or greater, and wherein a is the total length of the first axis (40) and b is the total length of the second axis (42), and wherein x and y define a point on the seal region (44), where x is the distance from the geometric centre along a (45) and y is the distance from the geometric centre along b (46).

The unit dose articles may comprise a dusting agent applied to the outside of the unit dose article. Dusting agents can include talc, silica, zeolite, carbonate or mixtures thereof.

It was surprisingly found the superelliptical shape provided maximal internal volume whilst still maintaining excellent structural stability and dissolution speed of the unit dose article. Without wishing to be bound by theory, a rectangular or square unit dose article or compartment thereof has excellent internal volume but suffers from reduced structural stability, especially in the areas of weakness in the corners. A circular unit dose article or compartment thereof has excellent structural stability, but suffers from poor internal volume.

It was also surprisingly found that a superelliptical shape did not suffer from the drawbacks of increased manufacturing complexity to the same extent as a circular shape. As explained earlier, during manufacture, pieces of film are formed into the relevant three-dimensional shape in order to make the unit dose article. Once sealed, excess film material is then cut away from said film area. If the seal area is circular, this adds complexity to the cutting operation. Alternatively, the seal area may be cut into a square or rectangular shape, which removes a degree of manufacturing complexity, however, this results in wasted film material in the case where the seal area itself is circular in shape. This wasted film material negatively increases the overall dissolution time of the unit dose article (especially when it is considered that the wasted material consists of two films sealed together so also represents the 'thickest' part of the film material) and also has a negative impact on the aesthetic qualities of the unit dose article. For a superelliptically shaped seal area having a rectangular cut, the volume of wasted film was far less than for a circular seal area having a rectangular cut. This resulted in a unit dose article that exhibited improved dissolution and was more aesthetically pleasing than a unit dose article having a circular seal region and a rectangular cut.

Furthermore, without wishing to be bound by theory, it was surprisingly found that unit dose articles according to the present invention suffered less from 'sticking together' during manufacture and storage. Sometimes, due to unit dose articles being in close proximity in the package or on the production line they can stick together. This can cause issues during use/dispensing or during production and packaging (e.g. over filling of packs of blocking of machines). There is reduced area for intimate contact of the pouches due to each other due to the constant curvature of the superelliptical shape. This reduces the area available for the unit dose articles to stick to one another.

Water Soluble Film

The film of the present invention is soluble or dispersible in water. The water-soluble film preferably has a thickness of from 20 to 150 μm, preferably 35 to 125 micron, even more preferably 50 to 110 micron, most preferably about 76 micron.

Preferably, the film has a water-solubility of at least 50%, preferably at least 75% or even at least 95%, as measured by the method set out here after using a glass-filter with a maximum pore size of 20 microns:

50 g±0.1 g of film material is added in a pre-weighed 400 mL beaker and 245 ml±1 ml of distilled water is added. This is stirred vigorously on a magnetic stirrer, Labline model No. 1250 or equivalent and 5 cm magnetic stirrer, set at 600 rpm, for 30 minutes at 24° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Preferred film materials are preferably polymeric materials. The film material can, for example, be obtained by casting, blow-moulding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000.

Mixtures of polymers can also be used as the pouch material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000-40,000, preferably around 20,000, and of PVA or copolymer thereof, with a weight average molecular weight of about 100,000 to 300,000, preferably around 150,000. Also suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol. Preferred for use herein are polymers which are from about 60% to about 98% hydrolysed, preferably about 80% to about 90% hydrolysed, to improve the dissolution characteristics of the material.

Preferred films exhibit good dissolution in cold water, meaning unheated distilled water. Preferably such films exhibit good dissolution at temperatures 24° C., even more preferably at 10° C. By good dissolution it is meant that the film exhibits water-solubility of at least 50%, preferably at least 75% or even at least 95%, as measured by the method set out here after using a glass-filter with a maximum pore size of 20 microns, described above.

Preferred films are those supplied by Monosol under the trade references M8630, M8900, M8779, M9467, M8310, films described in U.S. Pat. No. 6,166,117 and U.S. Pat. No. 6,787,512 and PVA films of corresponding solubility and deformability characteristics. Further preferred films are those described in US2006/0213801, WO 2010/119022 and U.S. Pat. No. 6,787,512.

Of the total PVA resin content in the film described herein, the PVA resin can comprise about 30 to about 85 wt. % of the first PVA polymer, or about 45 to about 55 wt. % of the first PVA polymer. For example, the PVA resin can contain about 50 wt. % of each PVA polymer, wherein the viscosity of the first PVA polymer is about 13 cP and the viscosity of the second PVA polymer is about 23 cP.

Naturally, different film material and/or films of different thickness may be employed in making the compartments of the present invention. A benefit in selecting different films is that the resulting compartments may exhibit different solubility or release characteristics.

The film material herein can also comprise one or more additive ingredients. For example, it can be beneficial to add plasticisers, for example glycerol, ethylene glycol, diethyleneglycol, propylene glycol, sorbitol and mixtures thereof. Other additives may include water and functional detergent additives, including surfactant, to be delivered to the wash water, for example organic polymeric dispersants, etc.

Composition

The composition may be any suitable composition. The composition may be in the form of a solid, a liquid, a dispersion, a gel, a paste or a mixture thereof. Non-limiting examples of compositions include cleaning compositions, fabric care compositions and hard surface cleaners. More particularly, the compositions may be a laundry, fabric care or dish washing composition including, pre-treatment or soaking compositions and other rinse additive compositions. The composition may be a fabric detergent composition or an automatic dish washing composition. The fabric detergent composition may be used during the main wash process or could be used as pre-treatment or soaking compositions.

Fabric care compositions include fabric detergents, fabric softeners, 2-in-1 detergent and softening, pre-treatment compositions and the like. Fabric care compositions comprise typical fabric care compositions, including surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments and mixtures thereof. The composition may be a laundry detergent composition comprising an ingredient selected from the group comprising a shading dye, surfactant, polymers, perfumes, encapsulated perfume materials, structurant and mixtures thereof.

The composition may be an automatic dish washing composition comprising an ingredient selected from surfactant, builder, sulfonated/carboxylated polymer, silicone suds suppressor, silicate, metal and/or glass care agent, enzyme, bleach, bleach activator, bleach catalyst, source of alkalinity, perfume, dye, solvent, filler and mixtures thereof.

Surfactants can be selected from anionic, cationic, zwitterionic, non-ionic, amphoteric or mixtures thereof. Preferably, the fabric care composition comprises anionic, non-ionic or mixtures thereof.

The anionic surfactant may be selected from linear alkyl benzene sulfonate, alkyl ethoxylate sulphate and combinations thereof.

Suitable anionic surfactants useful herein can comprise any of the conventional anionic surfactant types typically used in liquid detergent products. These include the alkyl benzene sulfonic acids and their salts as well as alkoxylated or non-alkoxylated alkyl sulfate materials.

Suitable nonionic surfactants for use herein include the alcohol alkoxylate nonionic surfactants. Alcohol alkoxylates are materials which correspond to the general formula: $R^1(C_mH_{2m}O)_nOH$ wherein $R^1$ is a $C_8$-$C_{16}$ alkyl group, m is from 2 to 4, and n ranges from about 2 to 12. In one aspect, $R^1$ is an alkyl group, which may be primary or secondary, that comprises from about 9 to 15 carbon atoms, or from about 10 to 14 carbon atoms. In one aspect, the alkoxylated fatty alcohols will also be ethoxylated materials that contain from about 2 to 12 ethylene oxide moieties per molecule, or from about 3 to 10 ethylene oxide moieties per molecule.

The shading dyes employed in the present laundry care compositions may comprise polymeric or non-polymeric dyes, pigments, or mixtures thereof. Preferably the shading dye comprises a polymeric dye, comprising a chromophore constituent and a polymeric constituent. The chromophore constituent is characterized in that it absorbs light in the wavelength range of blue, red, violet, purple, or combinations thereof upon exposure to light. In one aspect, the chromophore constituent exhibits an absorbance spectrum maximum from about 520 nanometers to about 640 nanometers in water and/or methanol, and in another aspect, from about 560 nanometers to about 610 nanometers in water and/or methanol.

Although any suitable chromophore may be used, the dye chromophore is preferably selected from benzodifuranes, methine, triphenylmethanes, napthalimides, pyrazole, napthoquinone, anthraquinone, azo, oxazine, azine, xanthene, triphenodioxazine and phthalocyanine dye chromophores. Mono and di-azo dye chromophores are preferred.

The shading dye may comprise a dye polymer comprising a chromophore covalently bound to one or more of at least three consecutive repeat units. It should be understood that the repeat units themselves do not need to comprise a chromophore. The dye polymer may comprise at least 5, or at least 10, or even at least 20 consecutive repeat units.

The repeat unit can be derived from an organic ester such as phenyl dicarboxylate in combination with an oxyalkyleneoxy and a polyoxyalkyleneoxy. Repeat units can be derived from alkenes, epoxides, aziridine, carbohydrate including the units that comprise modified celluloses such as hydroxyalkylcellulose; hydroxypropyl cellulose; hydroxypropyl methylcellulose; hydroxybutyl cellulose; and, hydroxybutyl methylcellulose or mixtures thereof. The repeat units may be derived from alkenes, or epoxides or mixtures thereof. The repeat units may be C2-C4 alkyleneoxy groups, sometimes called alkoxy groups, preferably derived from C2-C4 alkylene oxide. The repeat units may be C2-C4 alkoxy groups, preferably ethoxy groups.

For the purposes of the present invention, the at least three consecutive repeat units form a polymeric constituent. The polymeric constituent may be covalently bound to the chromophore group, directly or indirectly via a linking group. Examples of suitable polymeric constituents include polyoxyalkylene chains having multiple repeating units. In one aspect, the polymeric constituents include polyoxyalkylene chains having from 2 to about 30 repeating units, from 2 to about 20 repeating units, from 2 to about 10 repeating units or even from about 3 or 4 to about 6 repeating units. Non-limiting examples of polyoxyalkylene chains include ethylene oxide, propylene oxide, glycidol oxide, butylene oxide and mixtures thereof.

The dye may be introduced into the detergent composition in the form of the unpurified mixture that is the direct result of an organic synthesis route. In addition to the dye polymer therefore, there may also be present minor amounts of un-reacted starting materials, products of side reactions and mixtures of the dye polymers comprising different chain lengths of the repeating units, as would be expected to result from any polymerisation step.

The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

The fabric care compositions of the present invention may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1% to about 50% or even from about 0.1% to about 25% bleaching agent by weight of the subject cleaning composition.

The composition may comprise a brightener. Suitable brighteners are stilbenes, such as brightener 15. Other suitable brighteners are hydrophobic brighteners, and brightener 49. The brightener may be in micronized particulate form, having a weight average particle size in the range of from 3 to 30 micrometers, or from 3 micrometers to 20 micrometers, or from 3 to 10 micrometers. The brightener can be alpha or beta crystalline form.

The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein.

The composition may comprise a calcium carbonate crystal growth inhibitor, such as one selected from the group consisting of: 1-hydroxyethanediphosphonic acid (HEDP) and salts thereof; N,N-dicarboxymethyl-2-aminopentane-1, 5-dioic acid and salts thereof; 2-phosphonobutane-1,2,4-tricarboxylic acid and salts thereof; and any combination thereof.

The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

The fabric care composition may comprise one or more polymers. Suitable polymers include carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in ratio of 1:4:1, hexamethylenediamine derivative polymers, and any combination thereof.

Other suitable cellulosic polymers may have a degree of substitution (DS) of from 0.01 to 0.99 and a degree of blockiness (DB) such that either DS+DB is of at least 1.00 or $DB+2DS-DS^2$ is at least 1.20. The substituted cellulosic polymer can have a degree of substitution (DS) of at least 0.55. The substituted cellulosic polymer can have a degree of blockiness (DB) of at least 0.35. The substituted cellulosic polymer can have a DS+DB, of from 1.05 to 2.00. A suitable substituted cellulosic polymer is carboxymethylcellulose.

Another suitable cellulosic polymer is cationically modified hydroxyethyl cellulose.

Suitable perfumes include perfume microcapsules, polymer assisted perfume delivery systems including Schiff base perfume/polymer complexes, starch-encapsulated perfume accords, perfume-loaded zeolites, blooming perfume accords, and any combination thereof. A suitable perfume microcapsule is melamine formaldehyde based, typically comprising perfume that is encapsulated by a shell comprising melamine formaldehyde. It may be highly suitable for such perfume microcapsules to comprise cationic and/or cationic precursor material in the shell, such as polyvinyl formamide (PVF) and/or cationically modified hydroxyethyl cellulose (catHEC).

Suitable suds suppressors include silicone and/or fatty acid such as stearic acid.

Process for Machine Washing

The present invention is also to a process for the machine washing of laundry or dishware using an article according to the present invention, comprising the steps of, placing at least one article according to the present invention into the washing machine along with the laundry or dishware to be washed, and carrying out a washing or cleaning operation.

Any suitable washing machine may be used. Those skilled in the art will recognize suitable machines for the relevant wash operation. The article of the present invention may be used in combination with other compositions, such as fabric additives, fabric softeners, rinse aids and the like.

Process for Making

The present invention is also to a method of making the unit dose article according to the present invention. The process of the present invention may be continuous or intermittent. The process comprises the general steps of forming an open pouch, preferably by forming a water-soluble film into a mould to form said open pouch, filling the open pouch with a composition, closing the open pouch filled with a composition, preferably using a second water-soluble film to form the unit dose article. The second film may also comprise compartments, which may or may not comprise compositions. Alternatively, the second film may be a second closed pouch containing one or more compartments, used to close the open pouch. Preferably, the process is one in which a web of unit dose article are made, said web is then cut to form individual unit dose articles.

Alternatively, the first film may be formed into an open pouch comprising more than one compartment. In which case, the compartments formed from the first pouch may are in a side-by-side or 'tyre and rim' orientation. The second film may also comprise compartments, which may or may not comprise compositions. Alternatively, the second film may be a second closed pouch used to close the multicompartment open pouch.

The unit dose article may be made by thermoforming, vacuum-forming or a combination thereof. Unit dose articles may be sealed using any sealing method known in the art. Suitable sealing methods may include heat sealing, solvent sealing, pressure sealing, ultrasonic sealing, pressure sealing, laser sealing or a combination thereof.

The unit dose articles may be dusted with a dusting agent. Dusting agents can include talc, silica, zeolite, carbonate or mixtures thereof.

An exemplary means of making the unit dose article of the present invention is a continuous process for making an article according to any preceding claims, comprising the steps of:

a. continuously feeding a first water-soluble film onto a horizontal portion of an continuously and rotatably moving endless surface, which comprises a plurality of moulds, or onto a non-horizontal portion thereof and continuously moving the film to said horizontal portion;

b. forming from the film on the horizontal portion of the continuously moving surface, and in the moulds on the surface, a continuously moving, horizontally positioned web of open pouches;

c. filling the continuously moving, horizontally positioned web of open pouches with a product, to obtain a horizontally positioned web of open, filled pouches;

d. preferably continuously, closing the web of open pouches, to obtain closed pouches, preferably by feeding a second water-soluble film onto the horizontally positioned web of open, filed pouches, to obtain closed pouches; and e. optionally sealing the closed pouches to obtain a web of closed pouches.

The second water-soluble film may comprise at least one open or closed compartment.

In one embodiment, a first web of open pouches is combined with a second web of closed pouches preferably wherein the first and second webs are brought together and sealed together via a suitable means, and preferably wherein the second web is a rotating drum set-up. In such a set-up, pouches are filled at the top of the drum and preferably sealed afterwards with a layer of film, the closed pouches come down to meet the first web of pouches, preferably open pouches, formed preferably on a horizontal forming surface. It has been found especially suitable to place the rotating drum unit above the horizontal forming surface unit.

Preferably, the resultant web of closed pouches are cut to produce individual unit dose articles.

Mould

Figure 11:
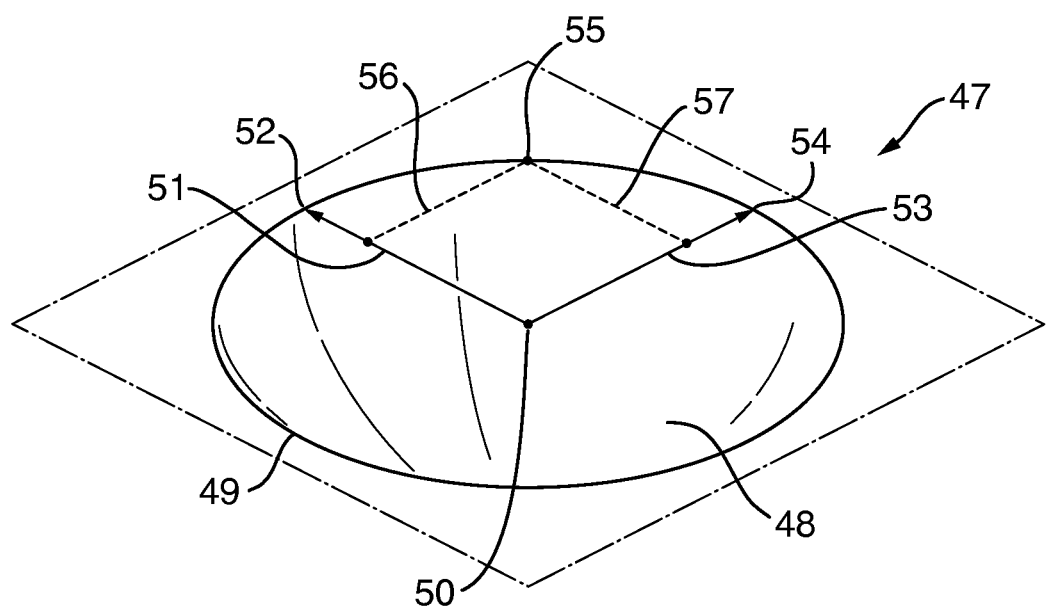
FIG. 11. A three-dimensional representation of a mould according to the present invention.

The present invention is also to a mould (47) for producing thermoformed or vacuum-formed articles, wherein the mould has a substantially superelliptical shape (FIG. 11). A mould (47) is defined as an impression used to define the shape of the resultant unit dose article. Preferably, the mould is used in the process according to the present invention. Preferably, the mould comprises at least one cavity (48), wherein the cavity has an opening (49), and wherein the opening of the at least one cavity has a substantially superelliptical shape. Preferably, a water-soluble film is placed over the opening of the mould (49) and the film drawn down into the cavity (48) of the mould such that it follows the contours of the cavity. This then defines the shape of the internal compartment. The internal compartment is then filled with the composition and the opening of the pouch is closed with a second film.

By substantially superelliptical we herein mean the opening of the mould (49) is mainly superelliptical, but may comprise imperfections, such as indents or protrusions.

The shape of the opening of the mould can be defined mathematically. The opening of the mould comprises a geometric centre point (50), and a first axis (51) that runs from the geometric centre point (50) of the opening to the edge of the opening (52) and a second axis (53) that runs from the geometric centre point (50) of the opening to the edge of the opening (54) and wherein the first and second axis are at an angle of 90° to one another and around which the shape of the opening is symmetrical, and wherein the shape of the opening is defined by the following equation;

$$\left|\frac{x}{a}\right|^n + \left|\frac{y}{b}\right|^n = 1$$

wherein n is 2.0 or greater, and wherein a is the total length of the first axis (51) and b is the total length of the second axis (53), and wherein x and y define a point on the edge of the opening (55), where x is the distance from the geometric centre along a (56) and y is the distance from the geometric centre along b (57). If n is equal to 2.0, then a and b are different. The mould may have a shape where n is greater than 2.0. The ratio of a to b may be from 1:10 to 10:1, or even from 1:5 to 5:1, or even from 1:2 to 2:1, or even from 1:1.2 to 1.2:1, or even 1:1.1 to 1.1:1, or even 1:1. The mould may be such that n is greater than 2.0, but no greater than 6.0, or even wherein n is between 2.1 and 5.5, or even between 2.2 and 3.5, or even between 2.2 and 3 or even 2.37.

There may be up to a 1% error margin in the shape of the mould, including the shape of the opening of the mould.

The opening of the mould may have a superelliptical shape where n is greater than 2, preferably, between 2.2 and 3.0, or even 2.37, and the ratio of a to be is from 1:2 to 2:1 or even from 1:1.2. to 1.2:1.

It should be noted that in accordance with the present invention, it is not intended that the term 'superellipse' includes a circle.

Preferably, the length of the first axis (51) is between 10 mm and 100 mm, preferably 15 mm and 90 mm, most preferably between 20 mm and 80 mm, and the length of the second axis (53) is between 10 mm and 100 mm, preferably 15 mm and 90 mm, most preferably between 20 mm and 80 mm. The cavity may have a depth, wherein the depth is measured from the geometric centre of the opening to the bottom of the cavity and wherein the depth is between 1 mm and 50 mm, preferably between 2.5 mm and 45 mm, most preferably between 5 mm and 40 mm.

The mould may be shaped such that the opening is substantially superelliptical in shape, however, the bottom of the cavity may have a different shape. Alternatively the bottom of the cavity may have a substantially superelliptical shape as viewed from at least one orientation.

In some aspects, the mould comprises one or more holes, which may be connected to a system that can provide a vacuum through the holes onto the film above the holes. The vacuum system may comprise a vacuum chamber, which may comprise at least two different units; each unit may be separated in different compartments.

The mould may comprise more than one cavity. In which case, each individual cavity may not necessarily have a superelliptical shape, however, the orientation of the cavities together form a substantially superelliptical shape.

Pouches, methods of making pouches, and moulds are further described in US Patent Applications 2002/0169092A1 and 2009/0199877A1, both assigned to The Procter and Gamble Company, and both incorporated herein by reference.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water soluble unit dose article (1) comprising at least one compartment (2), wherein the compartment comprises a composition, and wherein the compartment has a substantially superelliptical shape;

wherein the article comprises at least two films, wherein a first film (19) and a second film (20) are sealed together at a seal region (4) to form the compartment (2) and wherein the seal region (4) has a substantially super-elliptical shape; and wherein the compartment (2) has a geometric centre point (21), and a first axis (22) that runs from the geometric centre point (21) to a point on the seal region (23) along a second axis (24) that runs from the geometric centre point (21) to a point on the seal region (25) and wherein the first and second axis are at an angle of 90° to one another and around which the shape of the seal region (4) is symmetrical, and wherein the shape of the seal region is defined by the following equation:

$$\left|\frac{x}{a}\right|^n + \left|\frac{y}{b}\right|^n = 1$$

wherein n is greater than 2.0 and no greater than about 5.5, and wherein a is the total length of the first axis (22) and b is the total length of the second axis (24), and wherein x and y define a point on the seal region (26), where x is the distance from the geometric centre along a (27) and y is the distance from the geometric centre along b (28).

2. The article according to claim 1, wherein the ratio of a to b is from about 1:10 to about 10:1.

3. The article according to claim 1, wherein the ratio of a to b is from about 1:2 to about 2:1.

4. The article according to claim 1, wherein n is between about 2.2 and about 3.5.

5. The article according to claim 1, wherein the article comprises at least two compartments.

6. The article according to claim 1, wherein the article comprises at least two compartments, arranged such that at least two of the compartments are superposed on top of one another, and wherein at least one of the compartments is the compartment having the substantially superelliptical shape.

7. The article according to claim 1, wherein the article comprises at least three compartments, arranged such the second and third compartments are smaller than the first compartment and the second and third compartments are superposed on top of the first compartment, and wherein at least one of the compartments is the compartment having the substantially superelliptical shape.

8. The article according to claim 1, wherein the composition is a laundry detergent composition, an automatic dish washing composition, or a mixture thereof.

9. The article according to claim 1, wherein the composition is a solid, liquid, dispersion, gel, paste or mixtures thereof.

10. The article according to claim 1, wherein the article is thermoformed, vacuum-formed, or a mixture thereof.

11. The article according to claim 1, wherein at least one of the films comprises polyvinyl alcohol(s) and/or polyvinyl alcohol copolymers, and has a thickness of between 20 and 100 μm.

12. A process for the machine washing of laundry or dishware comprising the steps of: placing at least one article according to claim 1 into the washing machine along with the laundry or dishware to be washed, and carrying out a washing or cleaning operation.

13. A continuous process for making an article according to claim 1, comprising the steps of:
   a. continuously feeding a first water-soluble film onto a horizontal portion of a continuously and rotatably moving endless surface, which comprises a plurality of moulds, or onto a non-horizontal portion thereof and continuously moving the film to said horizontal portion;
   b. forming from the film on the horizontal portion of the continuously moving surface, and in the moulds on the surface, a continuously moving, horizontally positioned web of open pouches;
   c. filling the continuously moving, horizontally positioned web of open pouches with a composition, to obtain a horizontally positioned web of open, filled pouches;
   d. closing the web of open pouches, to obtain closed pouches; and
   e. optionally sealing the closed pouches to obtain a web of closed pouches.

14. The process according to claim 13, further comprising feeding a second water-soluble film onto the horizontally positioned web of open, filled pouches to obtain closed pouches, and wherein the second water-soluble film comprises at least one open or closed compartment.

15. The process according to claim 14, wherein a first web of closed pouches is combined with a second web of closed pouches.

16. The process according to claim 13, wherein the resultant web of closed pouches are cut to produce individual pouches.

* * * * *